(12) United States Patent
Mega et al.

(10) Patent No.: US 11,420,260 B2
(45) Date of Patent: Aug. 23, 2022

(54) METHOD OF MANUFACTURING FABRICATED OBJECT

(71) Applicant: MITSUBISHI HEAVY INDUSTRIES, LTD., Tokyo (JP)

(72) Inventors: Masahiko Mega, Tokyo (JP); Shuji Tanigawa, Tokyo (JP); Masashi Kitamura, Tokyo (JP); Masayuki Ota, Tokyo (JP); Takahisa Hasegawa, Tokyo (JP); Koji Tsukimoto, Tokyo (JP); Hiroki Komuro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/152,275

(22) Filed: Jan. 19, 2021

(65) Prior Publication Data

US 2021/0299751 A1 Sep. 30, 2021

(30) Foreign Application Priority Data

Mar. 31, 2020 (JP) .............................. JP2020-061730

(51) Int. Cl.
*B22F 10/28* (2021.01)
*B22F 12/41* (2021.01)
*B33Y 10/00* (2015.01)

(52) U.S. Cl.
CPC .............. *B22F 10/28* (2021.01); *B22F 12/41* (2021.01); *B22F 2998/10* (2013.01); *B33Y 10/00* (2014.12)

(58) Field of Classification Search
CPC ........ F05D 2230/31; B22F 5/10; B22F 10/28; B22F 5/04; B22F 3/24
See application file for complete search history.

(56) References Cited

U.S. PATENT DOCUMENTS

| | | | |
|---|---|---|---|
| 6,454,156 B1 * | 9/2002 | Taras, Jr. | .................. F01D 5/18 228/119 |
| 7,533,795 B2 * | 5/2009 | Schaeffer | ............... B23K 31/02 228/119 |
| 7,600,666 B2 * | 10/2009 | Rabinovich | ............. B23P 6/005 228/125 |
| 9,599,756 B2 * | 3/2017 | Scheiding | ................ G02B 5/10 |
| 10,265,806 B2 * | 4/2019 | Cui | ...................... B23K 1/0018 |
| 10,337,331 B2 * | 7/2019 | Jones | ..................... B22F 10/20 |

(Continued)

FOREIGN PATENT DOCUMENTS

| | | |
|---|---|---|
| CN | 208619176 | 3/2019 |
| CN | 110802372 | 2/2020 |

(Continued)

OTHER PUBLICATIONS

CN-110142408-B Machine Translation (Year: 2021).*

(Continued)

*Primary Examiner* — Jacob J Cigna
*Assistant Examiner* — Michael W Hotchkiss
(74) *Attorney, Agent, or Firm* — Wenderoth, Lind & Ponack, L.L.P.

(57) ABSTRACT

A method of manufacturing a fabricated object includes forming the fabricated object by laminating metal powder, the fabricated object including an opening portion that communicates with a hollow internal space, mounting a plug in the opening portion, and welding the plug mounted in the opening portion to the fabricated object.

11 Claims, 11 Drawing Sheets

(56) References Cited

U.S. PATENT DOCUMENTS

| | | | |
|---|---|---|---|
| 10,350,684 B2* | 7/2019 | Bunker | B22F 7/08 |
| 10,385,432 B2* | 8/2019 | Kilmer | C22C 21/08 |
| 10,583,606 B2* | 3/2020 | Joerger | B29C 64/40 |
| 10,618,128 B2* | 4/2020 | Lin | C23C 24/04 |
| 10,744,565 B2 | 8/2020 | Okazaki | |
| 10,780,501 B2* | 9/2020 | Wu | B22F 3/1241 |
| 10,821,485 B2* | 11/2020 | Barua | B08B 5/02 |
| 10,837,287 B2* | 11/2020 | Abrari | F04D 29/284 |
| 10,946,473 B2* | 3/2021 | Bunker | B22F 10/00 |
| 2015/0360292 A1* | 12/2015 | Kountanya | B22F 5/04 |
| | | | 419/53 |
| 2016/0136883 A1* | 5/2016 | Schmidt | B29C 64/386 |
| | | | 264/129 |
| 2016/0228929 A1* | 8/2016 | Williamson | B08B 7/02 |
| 2016/0356162 A1* | 12/2016 | Jones | B23K 26/342 |
| 2017/0129014 A1* | 5/2017 | Bunker | B22F 5/04 |
| 2017/0232670 A1* | 8/2017 | Joerger | B33Y 40/20 |
| | | | 264/497 |
| 2018/0001384 A1* | 1/2018 | Manteiga | F01D 25/24 |
| 2018/0111200 A1* | 4/2018 | Bunker | F01D 5/186 |
| 2019/0076925 A1* | 3/2019 | Lakshman | B23K 26/342 |
| 2020/0001365 A1* | 1/2020 | Lebed | B22F 10/20 |
| 2020/0332719 A1* | 10/2020 | Binek | F02C 7/22 |
| 2020/0373642 A1* | 11/2020 | Aston | B22F 5/10 |

FOREIGN PATENT DOCUMENTS

| | | | | |
|---|---|---|---|---|
| CN | 110802372 A | * | 2/2020 | |
| CN | 110142408 B | * | 6/2021 | B22F 10/00 |
| DE | 102010046579 A1 | * | 3/2012 | B22F 3/1055 |
| EP | 2522810 A1 | * | 11/2012 | B22F 3/1055 |
| FR | 3026034 A1 | * | 3/2016 | B22F 3/1055 |
| JP | 3686344 | | 8/2005 | |
| JP | 5205499 | | 6/2013 | |
| JP | 2017-149139 | | 8/2017 | |
| JP | 6405028 | | 10/2018 | |

OTHER PUBLICATIONS

CN-110802372-A Machine Translation (Year: 2020).*
DE-102010046579-A1 Machine Translation (Year: 2012).*
EP-2522810-A1 Machine Translation (Year: 2012).*
FR-3026034-A1 Machine Translation (Year: 2016).*
Extended European Search Report dated Jun. 23, 2021 in corresponding European Patent Application No. 21152533.2.

* cited by examiner

METHOD OF MANUFACTURING FABRICATED OBJECT

CROSS-REFERENCE TO RELATED APPLICATIONS

This application claims the benefit of priority to Japanese Patent Application Number 2020-061730 filed on Mar. 31, 2020. The entire contents of the above-identified application are hereby incorporated by reference.

TECHNICAL FIELD

The present disclosure relates to a method of manufacturing a fabricated object.

RELATED ART

In recent years, an additive manufacturing method for obtaining a three-dimensional object by layering and fabricating metal is used as a method of manufacturing various metal products. For example, in an additive manufacturing method using a powder bed method, a three-dimensional object is formed by repeatedly welding and solidifying through irradiating a metal powder layered with an energy beam such as a light beam or an electron beam (for example, refer to Japanese Patent No. 6405028).

SUMMARY

For example, in the additive manufacturing method using a powder bed method, after the fabricated object is formed, metal powder remaining in the hollow internal space of the fabricated object is discharged to the outside of the fabricated object from an opening portion that communicates with the internal space. When leaving the opening portion is disadvantageous during use of the fabricated object, it is necessary to close the opening portion after the metal powder is discharged.

However, in a case where the opening portion is closed by, for example, TIG welding, it is difficult to ensure the flatness of the surface on which the closed portion faces the internal space. In addition, in a case where the opening portion is closed by TIG welding, heat input to the fabricated object tends to be relatively large, and there is a concern that the heat causes deformation of the fabricated object.

Further, it is also conceivable that the opening portion is closed by the fabricating method using, for example, a laser metal deposition (LMD) method, by suppressing the amount of heat input and blowing the welded metal powder to the wall that forms the opening portion. In this case, it is possible to expect suppression of deformation due to heat compared to TIG welding, but in the additive manufacturing method using an LMD method, it is difficult to close the bottomless opening portion.

In view of the above-described circumstances, it is an object of at least one embodiment of the present disclosure to facilitate closing the opening portion that communicates with the hollow internal space.

(1) According to at least one embodiment of the present disclosure, there is provided a method of manufacturing a fabricated object, including: a step of forming the fabricated object by layering metal powder, the fabricated object including an opening portion that communicates with a hollow internal space; a step of mounting a plug in the opening portion; and a step of welding the plug mounted in the opening portion to the fabricated object.

According to at least one embodiment of the present disclosure, it is possible to easily close the opening portion that communicates with the hollow internal space.

BRIEF DESCRIPTION OF DRAWINGS

The disclosure will be described with reference to the accompanying drawings, wherein like numbers reference like elements.

DESCRIPTION OF EMBODIMENTS

Embodiments of the present disclosure will be described hereinafter with reference to the appended drawings. It is intended, however, that unless particularly specified, dimensions, materials, shapes, relative positions and the like of components described in the embodiments and illustrated in the figures shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, and also includes a state where the arrangement is relatively displaced by tolerance or by an angle or a distance whereby it is possible to achieve the same function.

For instance, an expression of an equal state such as "same" "equal" and "uniform" shall not be construed as indicating only the state in which the feature is strictly equal and also includes a state in which there is a tolerance or a difference that can still achieve the same function.

Further, for instance, an expression of a shape such as a rectangular shape or a cylindrical shape shall not be construed as only a geometrically strict shape and also includes a shape with unevenness or chamfered corners within the range in which the same effect can be achieved.

On the other hand, an expression such as "comprise", "include", "have", "contain" and "constitute" are not intended to be exclusive of other components.

Three-Dimensional Additive Manufacturing Apparatus 1

Figure 1:
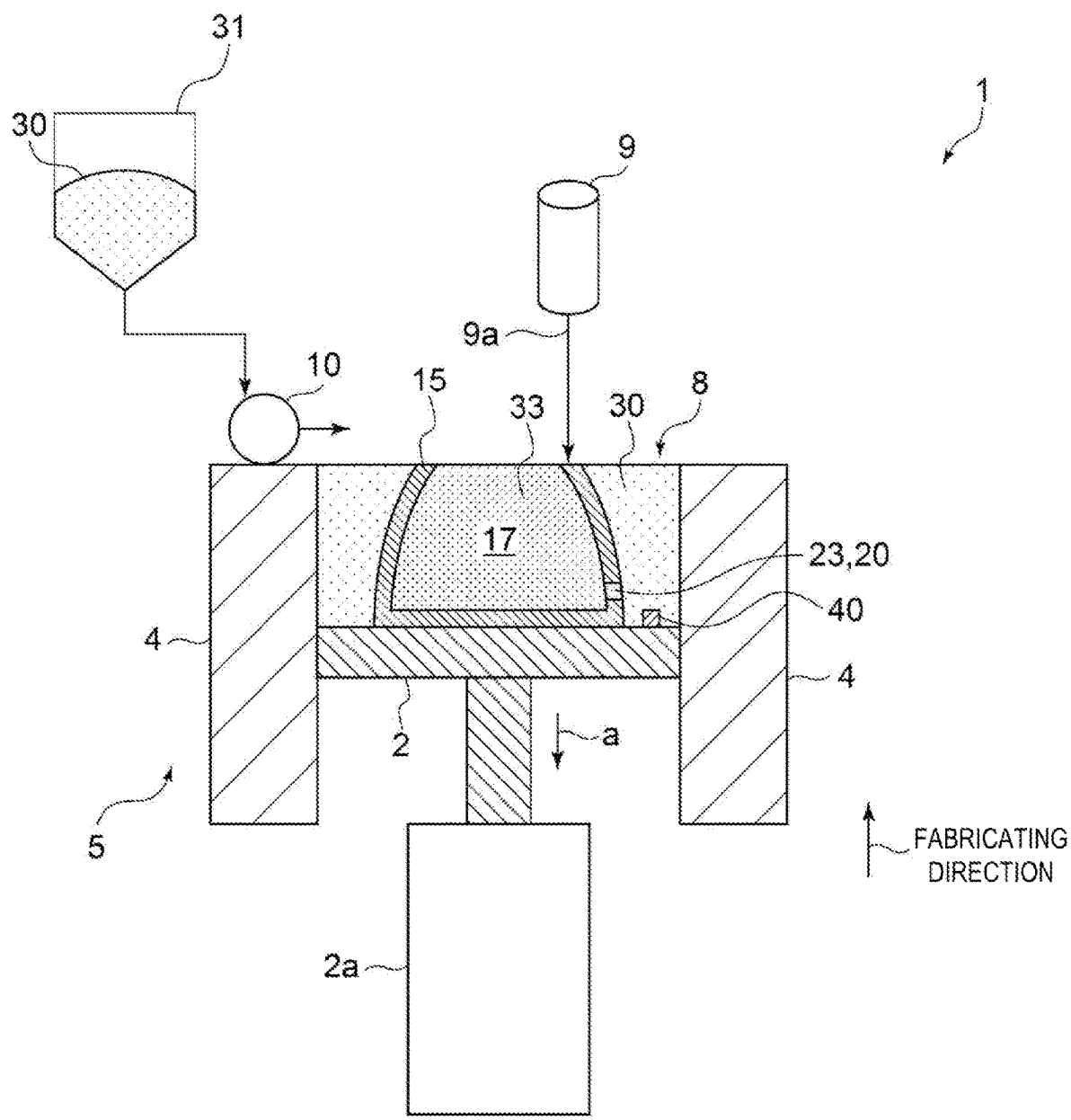
FIG. 1 is a schematic view illustrating an overall configuration of a three-dimensional additive manufacturing apparatus, which is an apparatus capable of applying a method of manufacturing a fabricated object according to at least one embodiment of the present disclosure.

FIG. 1 is a schematic view illustrating an overall configuration of a three-dimensional additive manufacturing apparatus 1, which is an apparatus capable of applying a method of manufacturing a fabricated object according to at least one embodiment of the present disclosure.

The three-dimensional additive manufacturing apparatus 1 is an apparatus for manufacturing a three-dimensional fabricated object 15 by performing additive manufacturing involving irradiating a metal powder, which is a raw material powder laid down in layers, with an energy beam. The three-dimensional additive manufacturing apparatus 1 can perform additive manufacturing using a powder bed method.

The three-dimensional additive manufacturing apparatus 1 illustrated in FIG. 1 can, for example, form a rotor blade or a stator vane of a turbine, such as a gas turbine or a steam turbine, or a component, such as a combustor basket, a transition piece, or a nozzle of a combustor.

The three-dimensional additive manufacturing apparatus 1 illustrated in FIG. 1 includes a storage portion 31 for a metal powder 30. The three-dimensional additive manufacturing apparatus 1 illustrated in FIG. 1 includes a powder bed forming portion 5 including a base plate 2 on which a powder bed 8 is formed by the metal powder 30 supplied from the storage portion 31. The three-dimensional additive manufacturing apparatus 1 illustrated in FIG. 1 includes a light beam irradiation unit 9 capable of irradiating the powder bed 8 with a light beam 9a.

The base plate 2 is a base on which the fabricated object 15 is fabricated. The base plate 2 is arranged such that base plate 2 can be lifted and lowered by a drive cylinder 2a on the inside of a substantially tube-shaped cylinder 4 having a central axis along the vertical direction. The powder bed 8 formed on the base plate 2 is newly formed by powder being spread out on the top layer side of the base plate 2 each time the base plate 2 descends in each cycle as indicated by the arrow a in FIG. 1 during the fabricating work.

FIG. 1 illustrates a case where the three-dimensional additive manufacturing apparatus 1 is irradiated with the light beam as an energy beam, but other forms of an energy beam such as an electron beam may be used.

The three-dimensional additive manufacturing apparatus 1 illustrated in FIG. 1 includes a powder laying unit 10 for laying down the metal powder 30 on the base plate 2 to form the powder bed 8. The powder laying unit 10 forms the layered powder bed 8 having a substantially uniform thickness across the entire upper surface of the base plate 2 by supplying the metal powder 30 from the storage portion 31 to the top surface side of the base plate 2 and flattening the surface. The powder bed 8 formed in each cycle is selectively solidified by being irradiated with the light beam 9a from the light beam irradiation unit 9. In the following cycle, the metal powder 30 is laid down again on the top layer side by the powder laying unit 10, and a new powder bed 8 is formed such that a plurality of powder beds 8 are stacked in layers.

In additive manufacturing using the powder bed method, in a case where a hollow internal space 17 exists inside the fabricated object 15, the metal powder 30 remains in the internal space 17 after the fabricated object 15 is formed. Thus, discharging the remaining metal powder (a residual powder 33) to the outside of the fabricated object 15 is preferable.

For example, in a case where an opening portion 20 that communicates with the internal space 17 is required when the fabricated object 15 is in use, and a necessary opening portion 21 to be described below is provided in the fabricated object 15, the residual powder 33 can be discharged from the necessary opening portion 21.

In a case where the necessary opening portion 21 is not provided in the fabricated object 15, or in a case where the discharge of the residual powder 33 is insufficient from the necessary opening portion 21 even when the necessary opening portion 21 is provided, a powder removal opening portion 23, which is the opening portion 20 that communicates with the internal space 17, is required for discharging the residual powder 33. The residual powder can be discharged when the powder removal opening portion 23 has a diameter of, for example, approximately 2 mm or greater.

However, when leaving the powder removal opening portion 23 is disadvantageous during use of the fabricated object 15, it is necessary to close the powder removal opening portion 23 after discharging the residual powder 33. For example, in a case where the internal space 17 that communicates with the powder removal opening portion 23 is a fluid flow path formed within the fabricated object 15 as described below and fluid leakage from anywhere other than the flow path inlet and the flow path outlet of the flow path is not allowed, the powder removal opening portion 23 must be closed. Note that the flow path inlet and the flow path outlet correspond to the necessary opening portion 21.

For example, from the viewpoint of suppressing pressure loss of the fluid that flows through the flow path, it is desirable that recesses and projections that have a non-negligible effect on pressure loss at the portion where the powder removal opening portion 23 is closed (the closed portion) are not generated facing the flow path. In other words, there is a case where it is desirable that the surface on the internal space 17 side of the closed portion is smooth. However, it is often difficult to process the surface on the internal space 17 side of the closed portion retroactively, and it may be difficult to observe the surface on the internal space 17 side of the closed portion.

However, in a case where the powder removal opening portion 23 is closed by, for example, tungsten inert gas (TIG) welding, it is difficult to ensure the flatness of the surface on the internal space 17 side of the closed portion. In addition, in a case where the powder removal opening portion 23 is closed by TIG welding, heat input to the fabricated object 15 tends to be relatively large, leading to a concern that this heat deforms the fabricated object 15.

Further, for example, when the fabricated object 15 is a component used in a high-temperature environment, from the viewpoint of heat resistance, it is desirable that the material used to close the powder removal opening portion 23 is the same material as that of the fabricated object 15. In other words, there is a case where it is desirable that the material used to close the powder removal opening portion 23 be the same material as that of the fabricated object 15. However, in a case where the powder removal opening portion 23 is closed by TIG welding, for example, the material of a filler such as a wire used for closing the powder removal opening portion 23 is limited, and thus, it may not be possible to close the opening portion with the same material as that of the fabricated object 15.

It is also conceivable to close the powder removal opening portion 23 by suppressing the amount of heat input and blowing the welded metal powder toward the wall surface that forms the powder removal opening portion 23, by using the fabricating method using a laser metal deposition (LMD) method, for example. In this case, it is possible to expect suppression of deformation due to heat compared to TIG welding. However, in an additive manufacturing method using an LMD method, it is difficult to close the bottomless opening portion.

Therefore, in the method of manufacturing a fabricated object according to some embodiments of the present disclosure, the above-described inconvenience is eliminated by manufacturing the fabricated object as described below. The method of manufacturing a fabricated object according to some embodiments of the present disclosure will be described hereinafter.

Flow Chart

Figure 2:
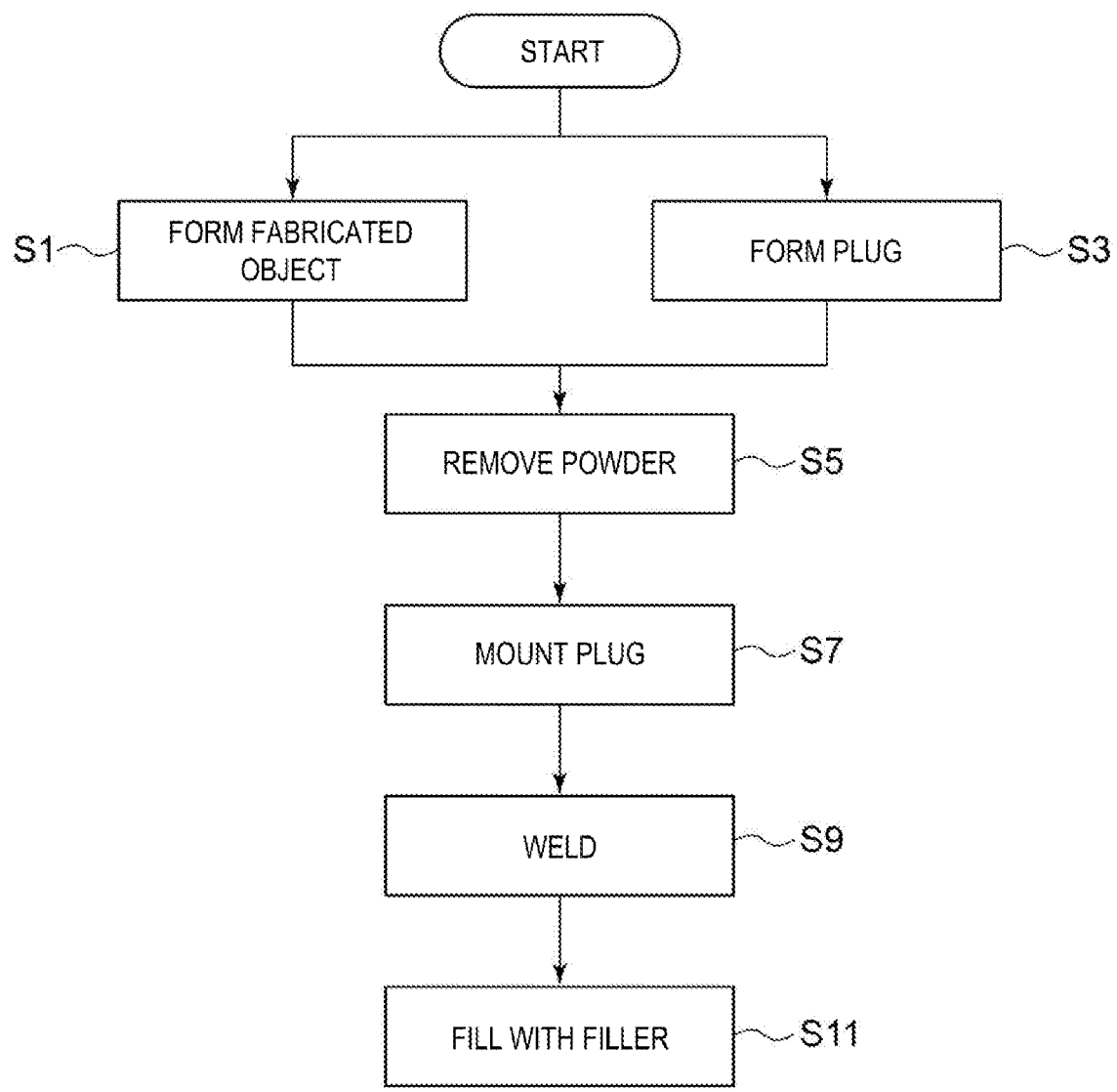
FIG. 2 is a flowchart illustrating a processing procedure in the method of manufacturing a fabricated object according to some embodiments of the present disclosure.

FIG. 2 is a flowchart illustrating a processing procedure in the method of manufacturing a fabricated object according to some embodiments of the present disclosure.

The method of manufacturing a fabricated object according to some embodiments includes a step S1 of forming the fabricated object, a step S3 of forming a plug, a step S5 of discharging residual powder, a step S7 of mounting the plug, and a step S9 of welding the plug to the fabricated object. In addition, the method of manufacturing a fabricated object according to some embodiments may further include a step S11 of filling recessed portion with a filler.

An overview of each of the steps will be described below.

Step S1 of Forming Fabricated Object

The step S1 of forming the fabricated object is a step of forming the fabricated object 15 including the opening portion 20 (powder removal opening portion 23) that communicates with the hollow internal space 17 by layering the metal powder 30 using, for example, the above-described three-dimensional additive manufacturing apparatus 1.

Figure 3A:
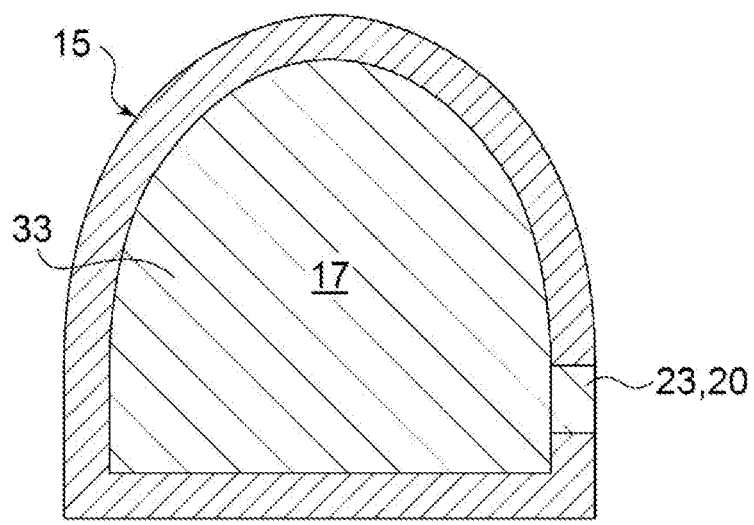
FIG. 3A is a schematic cross-sectional view of an example of the fabricated object obtained by executing steps of forming the fabricated object.

FIG. 3A is a schematic cross-sectional view of an example of the fabricated object 15 obtained by executing the step S1 of forming the fabricated object. FIG. 3A schematically illustrates a cross section of the fabricated object 15 taken along the fabricating direction (layering direction) of the fabricated object 15. In addition, the fabricating direction is a direction toward the upper side in FIG. 1.

In the step S1 of forming the fabricated object, as illustrated in FIG. 3A, for example, the fabricated object 15 including the internal space 17 and the powder removal opening portion 23 that communicates with the internal space 17 is formed. The residual powder 33 remains in the internal space 17 of the fabricated object 15 obtained by executing the step S1 of forming the fabricated object.

The shape of the powder removal opening portion 23 when the powder removal opening portion 23 is viewed from the outside to the inside of the fabricated object 15 may be, for example, circular may be elliptical, or may be rectangular. In other words, the shape of the powder removal opening portion 23 when the powder removal opening portion 23 is viewed from the outside to the inside of the fabricated object 15 is not particularly limited.

It is desirable that the minimum dimension of the powder removal opening portion 23 when the powder removal opening portion 23 is viewed from the outside to the inside of the fabricated object 15 is, for example, equal to or greater than 1.5 mm from the viewpoint of discharging the residual powder 33.

In addition, in the present specification, a direction when the powder removal opening portion 23 is viewed from the outside to the inside of the fabricated object 15, that is, a direction in which an inner opening end 23a at which the powder removal opening portion 23 opens to the internal space 17 and an outer opening end 23b at which the powder removal opening portion 23 opens to the outside of the fabricated object 15 are separated from each other is referred to as a thickness direction of the fabricated object 15 with respect to the powder removal opening portion 23, or simply referred to as a thickness direction of the fabricated object 15.

Step S3 of Forming Plug

The step S3 of forming the plug is a step of forming a plug 40 by layering the metal powder 30 using, for example, the above-described three-dimensional additive manufacturing apparatus 1. In addition, the plug 40 is a plug used for closing the powder removal opening portion 23 as described below.

In the step S3 of forming the plug, the plug 40 may be formed under the same conditions as the fabrication conditions of the fabricated object 15. The fabrication conditions include, for example, the output of the light beam 9a, the scanning speed of the light beam 9a, the beam diameter of the light beam 9a, the layering thickness of the metal powder 30 when the metal powder 30 is uniformly laid down on the powder bed 8 (descending amount of the base plate 2), and the like.

Further, in the step S3 of forming the plug, the plug 40 may be formed at the same time as the formation of the fabricated object 15. In other words, in the step S3 of forming the plug, for example, as illustrated in FIG. 1, by forming the plug 40 within the same powder bed 8 as the powder bed 8 in which the fabricated object 15 is formed, the plug 40 may be formed at the same time as the fabricated object 15.

Step S5 of Discharging Residual Powder

The step S5 of discharging residual powder is a step of discharging metal powder remaining in the internal space 17 (residual powder 33) from the opening portion 20 (powder removal opening portion 23) to the outside of the fabricated object 15 after the step S1 of forming the fabricated object.

Figure 3B:
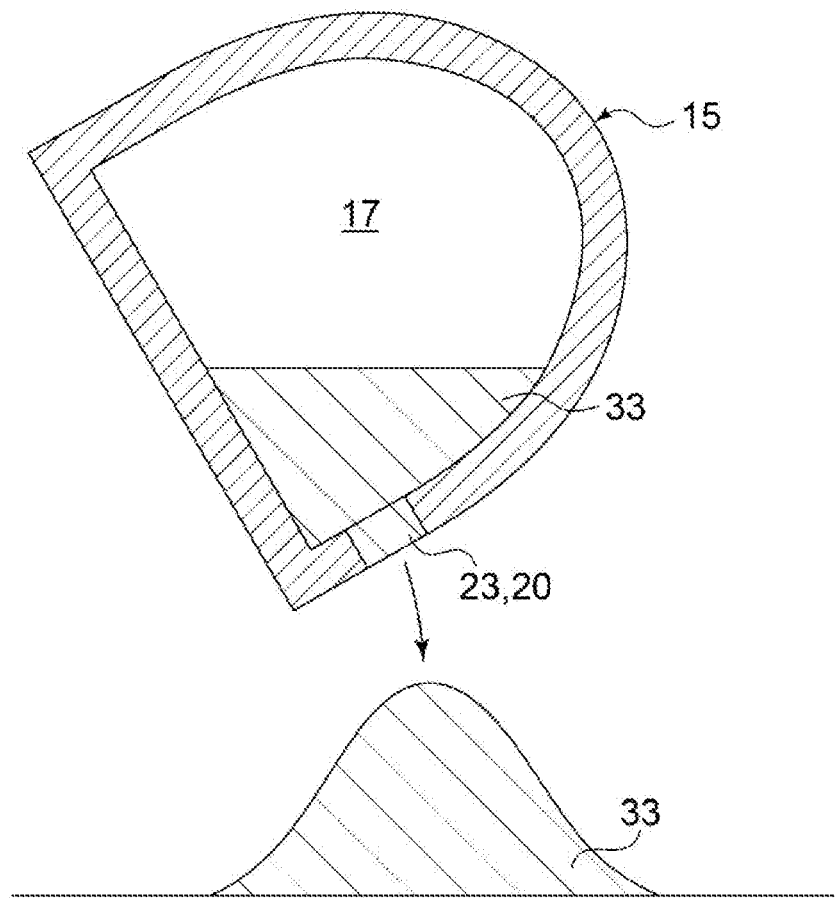
FIG. 3B is a view illustrating an aspect of discharging residual powder in an internal space from a powder removal opening portion to the outside of the fabricated object in a step of discharging the residual powder.

FIG. 3B is a view illustrating an aspect of discharging the residual powder 33 in the internal space 17 from the powder removal opening portion 23 to the outside of the fabricated object 15, in the step S5 of discharging the residual powder. As illustrated in FIG. 3B, in the step S5 of discharging the residual powder, the residual powder 33 in the internal space 17 is discharged from the powder removal opening portion 23 to the outside of the fabricated object 15.

Step S7 of Mounting Plug The step S7 of mounting the plug is a step of mounting the plug 40 to the opening portion 20 (powder removal opening portion 23).

Figure 3C:
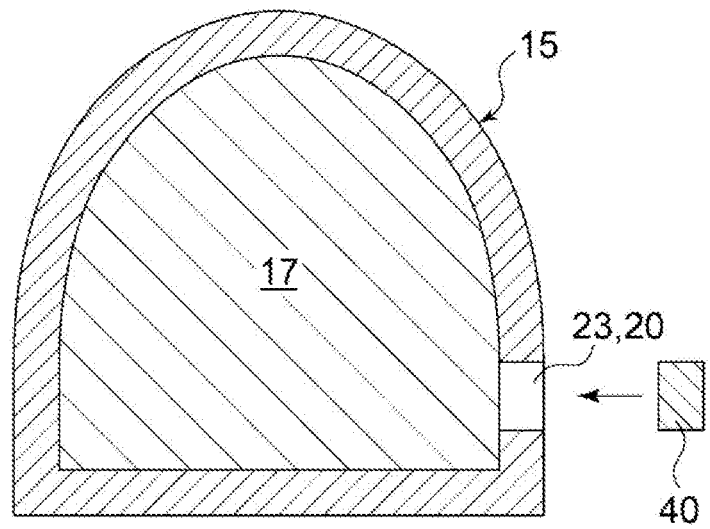
FIG. 3C is a view illustrating an aspect of mounting a plug in the powder removal opening portion in a step of mounting the plug.

FIG. 3C is a view illustrating an aspect of mounting the plug 40 in the powder removal opening portion 23, in the step S7 of mounting the plug.

Figure 4A:
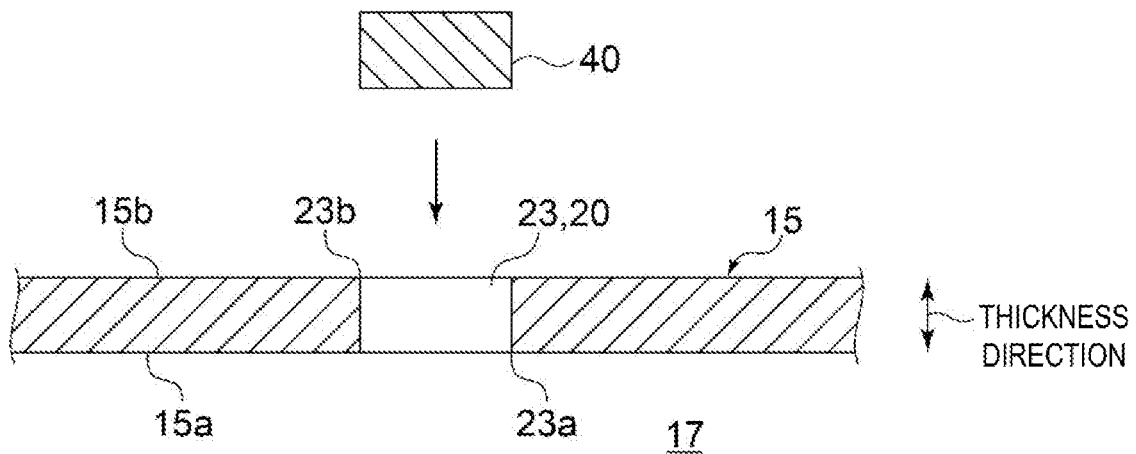
FIG. 4A is a view illustrating the vicinity of the powder removal opening portion.

FIG. 4A is a view illustrating the vicinity of the powder removal opening portion 23, and illustrates an aspect of mounting the plug 40 to the powder removal opening portion 23.

Figure 4B:
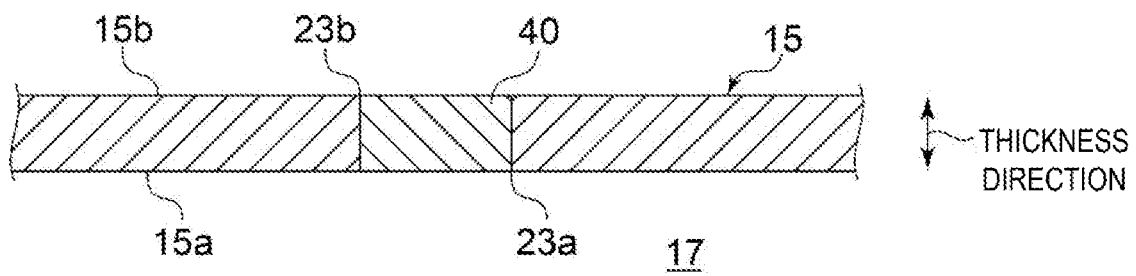
FIG. 4B is a view illustrating the vicinity of the powder removal opening portion.

FIG. 4B is a view illustrating the vicinity of the powder removal opening portion 23, and illustrates an aspect of mounting the plug 40 in the powder removal opening portion 23.

In the step S7 of mounting the plug, the plug 40 formed, for example, in the step S3 of forming the plug is mounted in the powder removal opening portion 23. In addition, in the step S7 of mounting the plug, a plug 40 formed by casting or the like may be mounted in the powder removal opening portion 23 rather than the plug 40 formed in the above-described step S3 of forming the plug.

Step S9 of Welding Plug to Fabricated Object

The step S9 of welding the plug to the fabricated object is a step of welding the plug 40 mounted in the opening portion 20 (powder removal opening portion 23) to the fabricated object 15.

Figure 4C:
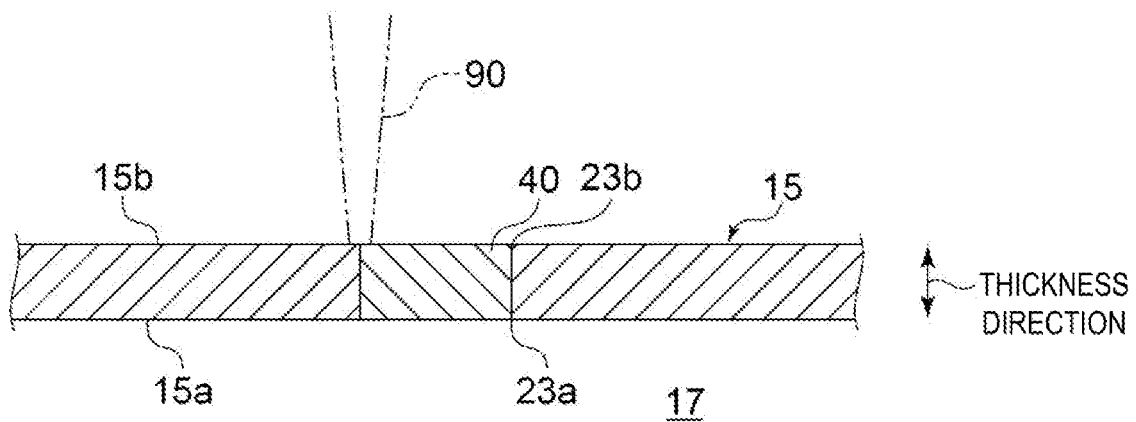
FIG. 4C is a view illustrating the vicinity of the powder removal opening portion.

FIG. 4C is a view illustrating the vicinity of the powder removal opening portion 23, and illustrates an aspect of welding the plug 40 mounted in the powder removal opening portion 23 to the fabricated object 15 by using an energy beam such as a light beam 90.

Figure 3D:
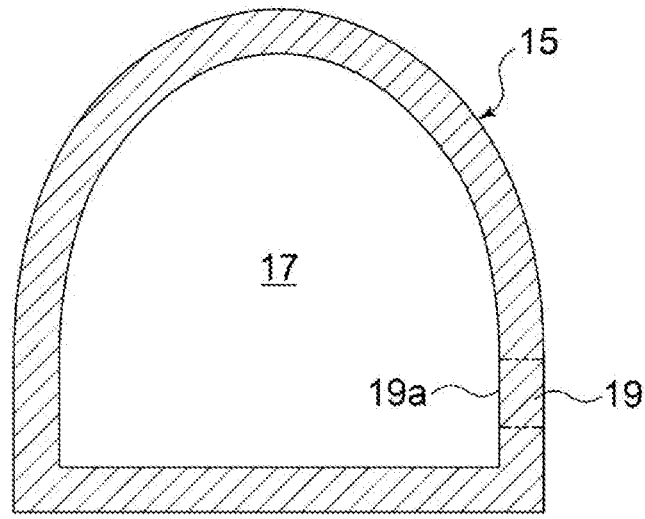
FIG. 3D is a schematic cross-sectional view of the fabricated object after executing a step of welding the plug to the fabricated object.

FIG. 3D is a schematic cross-sectional view of the fabricated object 15 after executing the step S9 of welding the plug to the fabricated object.

Figure 4D:
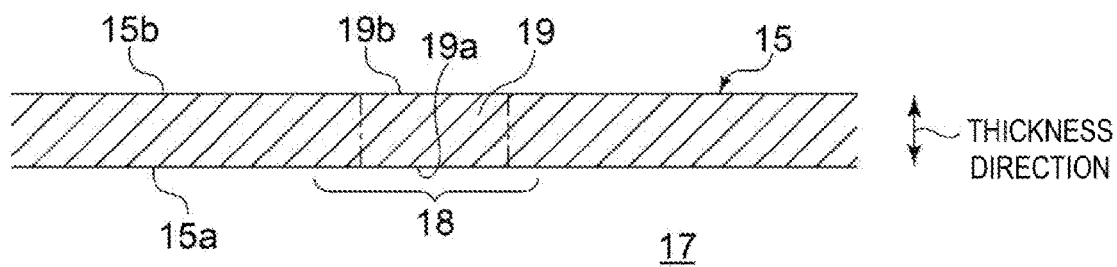
FIG. 4D is a view illustrating the vicinity of a region where the powder removal opening portion exists.

FIG. 4D is a view illustrating the vicinity of a region where the powder removal opening portion 23 exists, and schematically illustrates a cross section of the fabricated object 15 after executing the step S9.

In the step S9 of welding the plug to the fabricated object, the plug 40 and the fabricated object 15 are integrated by welding the plug 40 mounted in the powder removal opening portion 23 to the fabricated object 15 by using an energy beam such as the light beam 90. The portion where the powder removal opening portion 23 is closed in this manner is referred to as a closed portion 19. In addition, in FIGS. 3D and 4D, a position corresponding to the inner circumferential wall of the powder removal opening portion 23 is indicated by a two-dot chain line.

As described above, according to the method of manufacturing a fabricated object according to some embodiments, by welding the plug 40 mounted in the powder removal opening portion 23 to the fabricated object 15, it is possible to easily close the powder removal opening portion 23 that communicates with the hollow internal space 17.

In other words, by welding the plug 40 mounted in the powder removal opening portion 23 to the fabricated object 15, a surface (inner surface) 19a on the internal space 17 side of the closed portion 19 can be smoothed compared to that in a case where the powder removal opening portion 23 is closed by, for example, TIG welding.

In addition, by welding the plug 40 mounted in the powder removal opening portion 23 to the fabricated object 15, it is possible to suppress heat input to the fabricated object 15 and suppress deformation of the fabricated object 15 due to heat compared to a case where the powder removal opening portion 23 is closed by, for example, TIG welding.

When the material of the plug 40 is the same material as that of the fabricated object 15 and the plug 40 mounted in the powder removal opening portion 23 is welded to the fabricated object 15 by using an energy beam such as a light beam, it is possible to close the powder removal opening portion 23 with the same material as that of the fabricated object 15.

As described above, according to the method of manufacturing a fabricated object according to some embodiments, the step S5 of discharging residual powder is provided, and thus, it is possible to discharge the residual powder 33 that remains in the internal space 17 from the powder removal opening portion 23 to the outside of the fabricated object 15.

As described above, according to the method of manufacturing a fabricated object according to some embodiments, since the step S3 of forming the plug is provided, it is possible to form the plug 40 with the metal powder 30 used to form the fabricated object 15. Accordingly, the material of the plug 40 and the material of the fabricated object 15 can be the same. Therefore, similar to a case where the fabricated object 15 is, for example, a component used in a high-temperature environment, the method of manufacturing a fabricated object according to the above-described some embodiments is appropriate when it is desirable for the material used to close the powder removal opening portion 23 be the same material as that of the fabricated object 15.

As described above, in the step S3 of forming the plug, the plug 40 may be formed under the same conditions as the fabrication conditions of the fabricated object 15. Accordingly, quality, for example, surface roughness, dimensional tolerances, and the like can be kept equivalent between the fabricated object 15 and the plug 40.

In a case where the powder removal opening portion 23 is not formed in the fabricated object 15 in the step S1 of forming the fabricated object, it is necessary to form the powder removal opening portion 23 in the fabricated object 15 after the fabricated object 15 is formed. In this case, when the fabricated object 15 is a high-strength member such as a heat-resistant alloy, it is difficult to form the powder removal opening portion 23 in the fabricated object 15 by using a typical cutting process. Therefore, when the fabricated object 15 is a high-strength member such as a heat-resistant alloy, the powder removal opening portion 23 is formed in the fabricated object 15 by, for example, electric discharge machining.

However, the electrode for processing wears down during electric discharge machining, and thus it is necessary to appropriately modify the position of the electrode during processing. Therefore, in a case of forming the powder removal opening portion 23 in the fabricated object 15 by electric discharge machining, it is conceivable that the dimensions of the powder removal opening portion 23 differ slightly depending on the time of execution of the electric discharge machining. Therefore, there is a concern that inconveniences may occur in which the plug 40 cannot be mounted in the powder removal opening portion 23, or a gap between the powder removal opening portion 23 and the plug 40 is so large that it is difficult to retain the plug 40 in the powder removal opening portion 23 and the plug 40 easily falls out.

In addition, even in a case of forming the fabricated object 15 and the plug 40 by additive manufacturing, for example, there is a concern that the focal point of the light beam shifts over time, and when the formation timing of the fabricated object 15 and the plug 40 differ in units of a week or a month, for example, there is also a concern that the dimensional accuracy of the powder removal opening portion 23 and the dimensional accuracy of the plug 40 are not kept equivalent.

According to the method of manufacturing a fabricated object according to some embodiments, in the step S3 of forming the plug, by forming the plug 40 at the same time as the fabricated object 15, that is, by forming the plug 40 in the same powder bed 8 as the powder bed 8 on which the fabricated object 15 is formed, the quality of surface roughness, dimensional tolerances, and the like can be kept equivalent between the fabricated object 15 and the plug 40. Therefore, the dimensional accuracy of the powder removal opening portion 23 and the dimensional accuracy of the plug 40 can be equivalent. Accordingly, even when a process for adjusting dimensions is not performed after the formation of the powder removal opening portion 23 or the plug 40, inconveniences are unlikely to occur in which the plug 40 cannot be mounted in the powder removal opening portion 23 because the dimensional accuracy of the powder removal opening portion 23 and the dimensional accuracy of the plug 40 are not equivalent, or a gap between the powder removal opening portion 23 and the plug 40 is so large that it is difficult to retain the plug 40 in the powder removal opening portion 23 and the plug 40 easily falls off.

In addition, the dimensions and tolerance of the powder removal opening portion 23 and the dimensions and tolerance of the plug 40 are appropriately determined by the operator taking into consideration design requirements, materials, fitting methods (such as the presence or absence of tapers described below), or the processing accuracy of the three-dimensional additive manufacturing apparatus 1, but once the value can be set to an appropriate value, the need to reset each value is relatively low.

Another Embodiment in Step S1 of Forming Fabricated Object

Figure 4E:
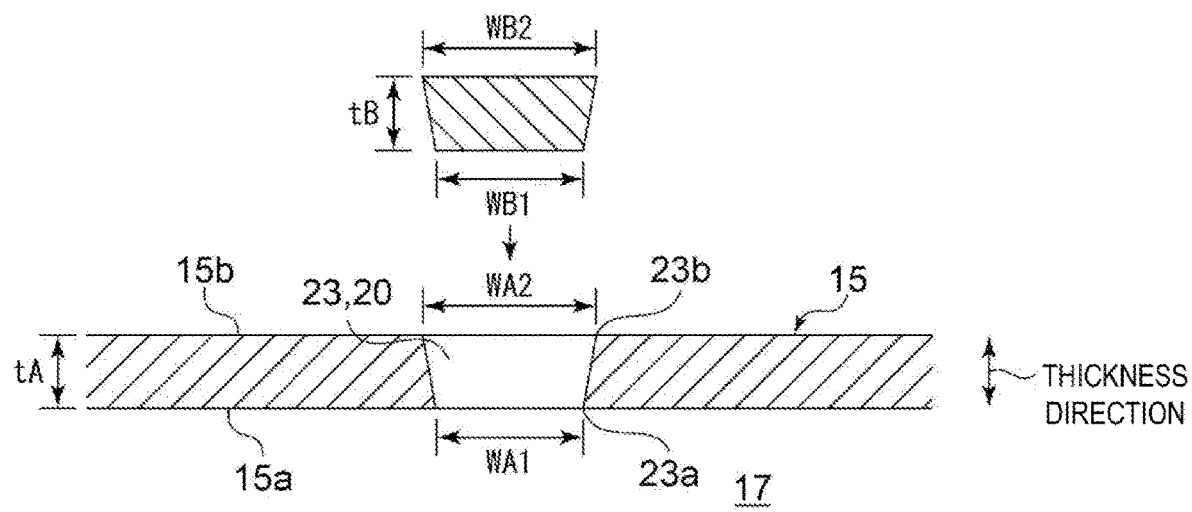
FIG. 4E is a view illustrating the vicinity of the powder removal opening portion according to another embodiment in the step of forming the fabricated object.

FIG. 4E is a view illustrating the vicinity of the powder removal opening portion 23 with respect to another embodiment in the step S1 of forming the fabricated object. FIG. 4E is a view corresponding to FIG. 4A.

In the step S1 of forming the fabricated object, as illustrated in FIG. 4E, the opening portion 20 (powder removal opening portion 23) may be formed to gradually decrease in size toward the inner side along the thickness direction of the fabricated object 15. In other words, the powder removal opening portion 23 may have a so-called tapered cross-sectional shape along the thickness direction of the fabricated object 15.

In a case where the cross-sectional shape of the powder removal opening portion 23 along the thickness direction of the fabricated object 15 is a tapered shape, the cross-sectional shape of the plug 40 may also be a tapered shape.

Accordingly, compared to a case where the size of the powder removal opening portion 23 does not change regardless of the position of the fabricated object 15 in the thickness direction, even when the dimensional accuracy of the powder removal opening portion 23 or the plug 40 decreases, a problem is unlikely to occur when the plug 40 is mounted in the powder removal opening portion 23.

Yet another Embodiment in Step S1 of Forming Fabricated Object

FIGS. 5A to 5E are views illustrating the vicinity of the powder removal opening portion 23 according to yet another embodiment in the step S1 of forming the fabricated object.

In the step S1 of forming the fabricated object, the fabricated object 15 may be formed to include a recessed portion 25 and the opening portion 20 (powder removal opening portion 23), which has a smaller dimension than that of a bottom surface 25a of the recessed portion 25 and is provided in the bottom surface 25a.

As a result of diligent research by the present inventors, when the thickness of the fabricated object 15 in the vicinity of the powder removal opening portion 23 is relatively thick, and in a case where the powder removal opening portion 23 is provided without providing the recessed portion 25, when the plug 40 mounted in the powder removal opening portion 23 is to be welded to the fabricated object 15, the heat capacity of the portion that surrounds the plug 40 in the fabricated object 15 is extremely large compared to the heat capacity of the plug 40. Therefore, the present inventors found that there is a concern that the temperature of the plug increases too much before welding the portion that surrounds the plug 40 at the time of welding and the plug melts down.

By providing the recessed portion 25 in the fabricated object 15 and forming the powder removal opening portion 23 in the bottom surface 25a of the recessed portion 25 as described above, it is possible to reduce the heat capacity of the portion that surrounds the plug 40 in the fabricated object 15 compared to a case where the recessed portion 25 is not provided. Accordingly, even when the thickness of the fabricated object 15 in the vicinity of the powder removal opening portion 23 is relatively thick, it is possible to weld the plug 40 mounted in the powder removal opening portion 23 to the fabricated object 15.

Now, each of the steps of the method of manufacturing a fabricated object will be described for a case where the recessed portion 25 is formed as described above.

Figure 5A:
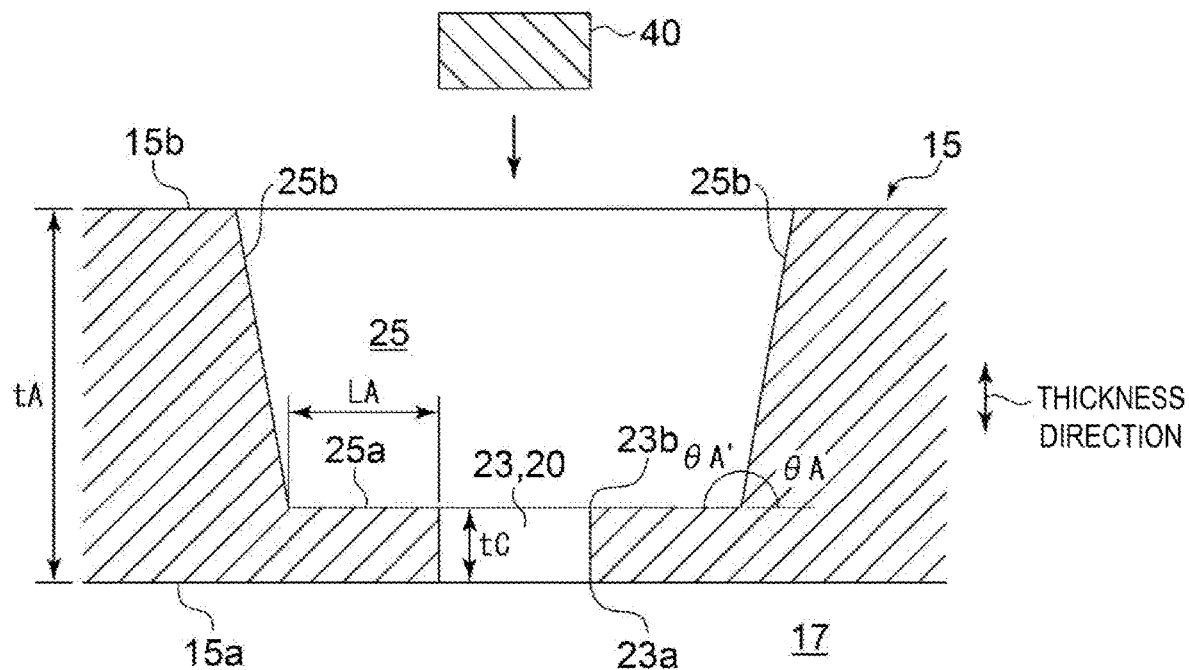
FIG. 5A is a view illustrating the vicinity of the powder removal opening portion according to yet another embodiment in the step of forming the fabricated object.

In the step S1 of forming the fabricated object, for example, as illustrated in FIG. 5A, the fabricated object 15 is formed to have the recessed portion 25 and the powder removal opening portion 23 provided in the bottom surface 25a. In addition, in the step S1 of forming the fabricated object, the powder removal opening portion 23 is formed such that the dimensions of the powder removal opening portion 23 when the recessed portion 25 is viewed from the outside to the inside of the fabricated object 15 are smaller than the dimensions of the bottom surface 25a.

In the step S3 of forming the plug, similar to the above-described embodiment, the plug 40 may be formed under the same conditions as the fabrication conditions of the fabricated object 15. In addition, in the step S3 of forming the plug, similar to the above-described embodiment, the plug 40 may be formed at the same time as the fabricated object 15 by forming the plug 40 in the same powder bed 8 as the powder bed 8 on which the fabricated object 15 is formed.

In the step S5 of discharging residual powder, similar to the above-described embodiment, the residual powder 33 in the internal space 17 is discharged from the powder removal opening portion 23 to the outside of the fabricated object 15.

Figure 5B:
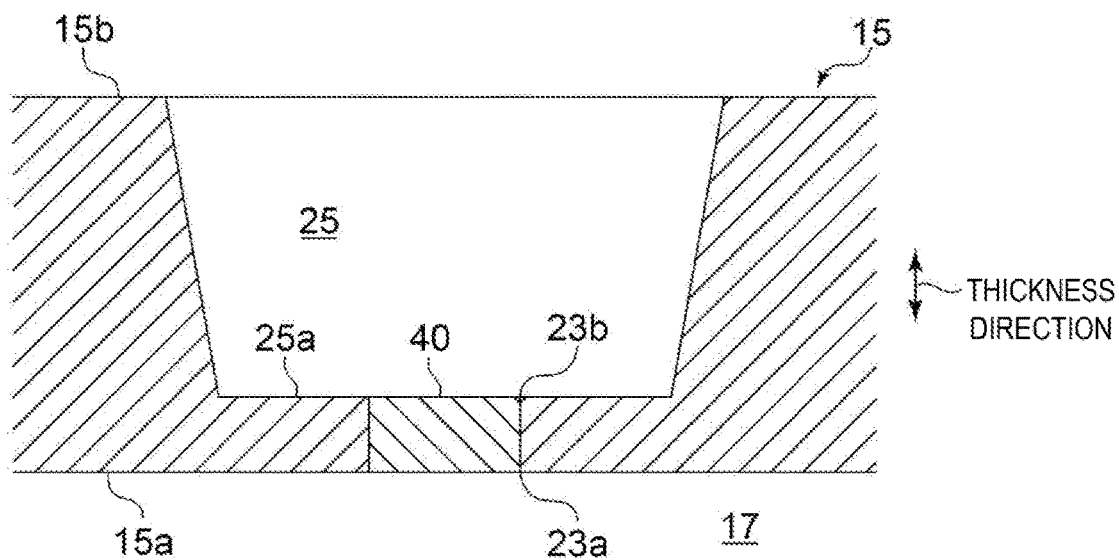
FIG. 5B is a view illustrating the vicinity of the powder removal opening portion according to yet another embodiment in the step of forming the fabricated object.

In the step S7 of mounting the plug, as illustrated in FIG. 5B, for example, the plug 40 formed in the step S3 of forming the plug is mounted in the powder removal opening portion 23. In addition, in the step S7 of mounting the plug, a plug 40 formed, for example, by casting or the like may be mounted in the powder removal opening portion 23 rather than the plug 40 formed in the above-described step S3 of forming the plug.

Figure 5C:
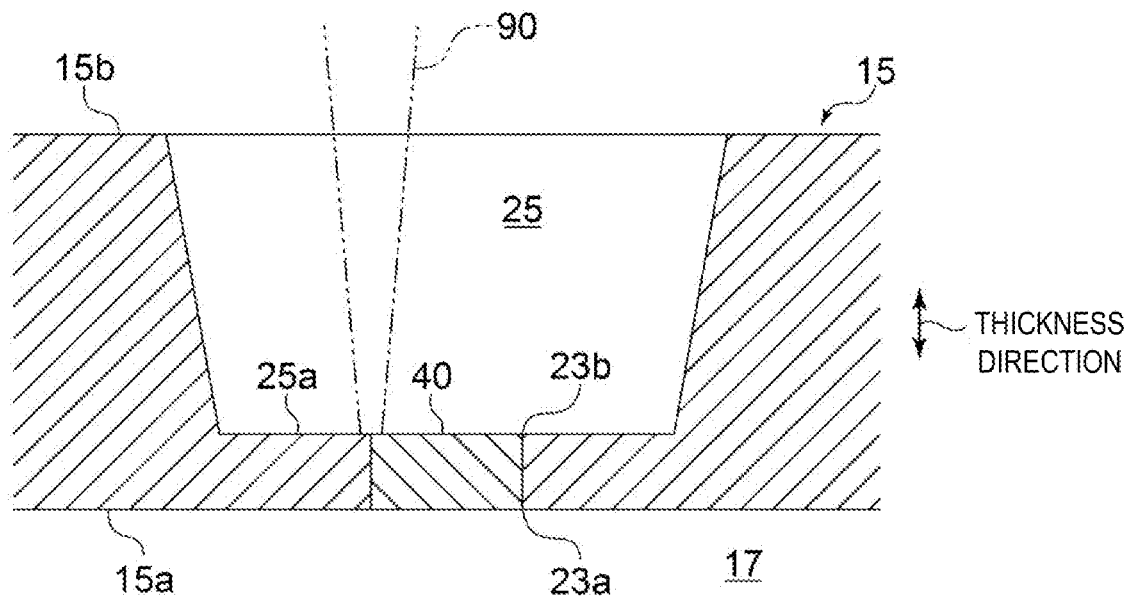
FIG. 5C is a view illustrating the vicinity of the powder removal opening portion according to yet another embodiment in the step of forming the fabricated object.
Figure 5D:
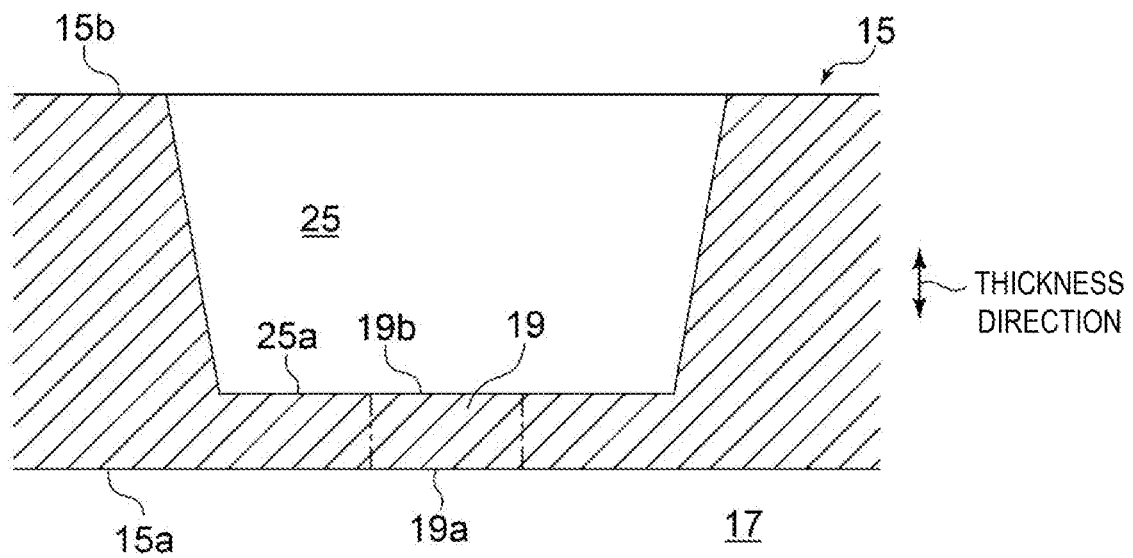
FIG. 5D is a view illustrating the vicinity of the powder removal opening portion according to yet another embodiment in the step of forming the fabricated object.

In the step S9 of welding the plug to the fabricated object, as illustrated in FIG. 5C, by welding the plug 40 mounted in the powder removal opening portion 23 to the fabricated object 15 by using an energy beam such as the light beam 90, the plug 40 and the fabricated object 15 are integrated as illustrated in FIG. 5D. In addition, in FIG. 5D, a position corresponding to the inner circumferential wall of the powder removal opening portion 23 is indicated by a two-dot chain line.

In a case where the recessed portion 25 is formed, the recessed portion 25 is in a state of remaining in the fabricated object 15 as illustrated in FIG. 5D after executing the step S9 of welding the plug to the fabricated object.

Here, in a case where the recessed portion 25 is formed, the method of manufacturing a fabricated object according to some embodiments may further include the step S11 of filling the recessed portion with the filler after the step S9 of welding the plug to the fabricated object.

Figure 5E:
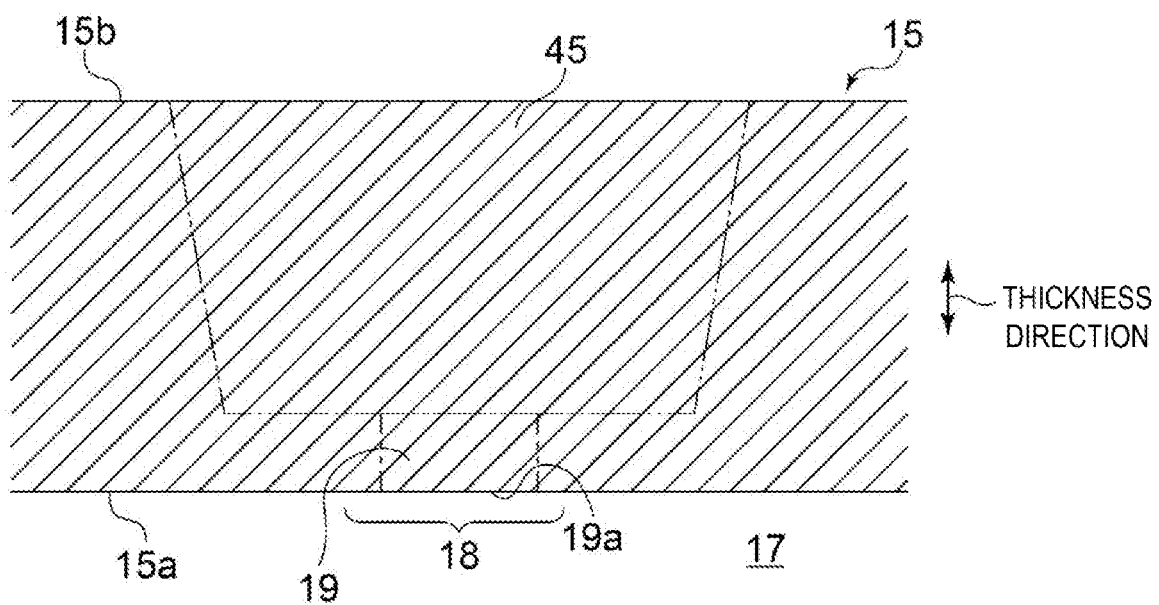
FIG. 5E is a view illustrating the vicinity of the powder removal opening portion according to yet another embodiment in the step of forming the fabricated object.

In the step S11 of filling the recessed portion with the filler, for example, as illustrated in FIG. 5E, the recessed portion 25 is filled with the filler 45. In the step S11 of filling the recessed portion with the filler, the powder removal opening portion 23 is already closed in the step S9 of welding the plug to the fabricated object, and thus, the opening portion 20 is in a state of being not present in the bottom surface 25a. Therefore, in the step S11 of filling the recessed portion with the filler, the recessed portion 25 may be filled with the filler 45 by, for example, TIG welding, or the recessed portion 25 may be filled with the filler 45 by the fabricating method using, for example, an LMD method.

Accordingly, the recessed portion 25 can be filled with the filler 45 to make the surface (outer surface) 15b of the fabricated object 15 smooth.

In addition, the material of the filler 45 may be the same material as that of the fabricated object 15, but may be a material different from that of the fabricated object 15.

Relationship Between Dimension of Powder Removal Opening Portion 23 and Dimension of Plug 40

In some embodiments, the maximum dimension of the powder removal opening portion 23 is preferably 105% or greater and 110% or less of the maximum dimension of the plug 40. More specifically, the maximum dimension of the powder removal opening portion 23 when viewed from the thickness direction of the fabricated object 15 with respect to the powder removal opening portion 23 is preferably 105% or greater and 110% or less of the maximum dimension of the plug 40 when viewed from the thickness direction.

For example, when the shape of the powder removal opening portion 23 when viewed from the thickness direction of the fabricated object 15 with respect to the powder removal opening portion 23 is circular, the diameter of the powder removal opening portion 23 may be 105% or greater and 110% or less of the diameter of the plug 40.

For example, when the shape of the powder removal opening portion 23 when viewed from the thickness direction of the fabricated object 15 with respect to the powder removal opening portion 23 is elliptical, the length of the long axis of the powder removal opening portion 23 may be 105% or greater and 110% or less of the length of the long axis of the plug 40.

For example, when the shape of the powder removal opening portion 23 when viewed from the thickness direction of the fabricated object 15 with respect to the powder removal opening portion 23 is rectangular, the length of the diagonal of the powder removal opening portion 23 may be 105% or greater and 110% or less of the length of the diagonal of the plug 40.

In other words, in some embodiments, in the step S1 of forming the fabricated object, the opening portion 20 (powder removal opening portion 23) may be formed to have a maximum dimension of 105% or greater and 110% or less of the maximum dimension of the plug 40.

Accordingly, the plug 40 can be easily inserted into the powder removal opening portion 23 while the gap between the powder removal opening portion 23 and the plug 40 is not extremely large.

In some embodiments, the dimension of the powder removal opening portion 23 along the thickness direction of the fabricated object 15 with respect to the powder removal opening portion 23 may be substantially the same as the dimension of the plug 40 along the thickness direction. Accordingly, it is possible to substantially eliminate the difference in dimensions of the plug 40 at the inner opening end 23a and the outer opening end 23b. In addition, in a case where the closed portion 19 is recessed more than the portion surrounding the closed portion 19 on the outer surface 15b of the fabricated object 15 after executing the step S9 of welding the plug to the fabricated object, the surface on the outer side (outer surface) 19b of the closed portion 19 may be built up, and may match the height of the surrounding portion of the closed portion 19.

In some embodiments, in the step S9 of welding the plug to the fabricated object, the plug 40 may be welded to the fabricated object 15 such that the flatness of a region 18 (refer to FIGS. 4D and 5E) affected by heat (heat-affected region) generated by welding the plug 40 to the fabricated object 15 is equal to or less than 0.3 mm, on the inner surface 15a of the fabricated object 15 and the inner surface 19a of the closed portion 19, which are the surfaces of the fabricated object 15 that face the internal space 17.

Accordingly, the heat-affected region 18 can be made smooth.

In particular, when the internal space 17 is a fluid flow path formed in the fabricated object 15, by making the heat-affected region 18 smooth, it is possible to suppress the pressure loss of the fluid that flows through the flow path.

In addition, the above-described flatness is, for example, a flatness specified by JIS B 0621.

Examples of Fabricated Object 15

Figure 6:
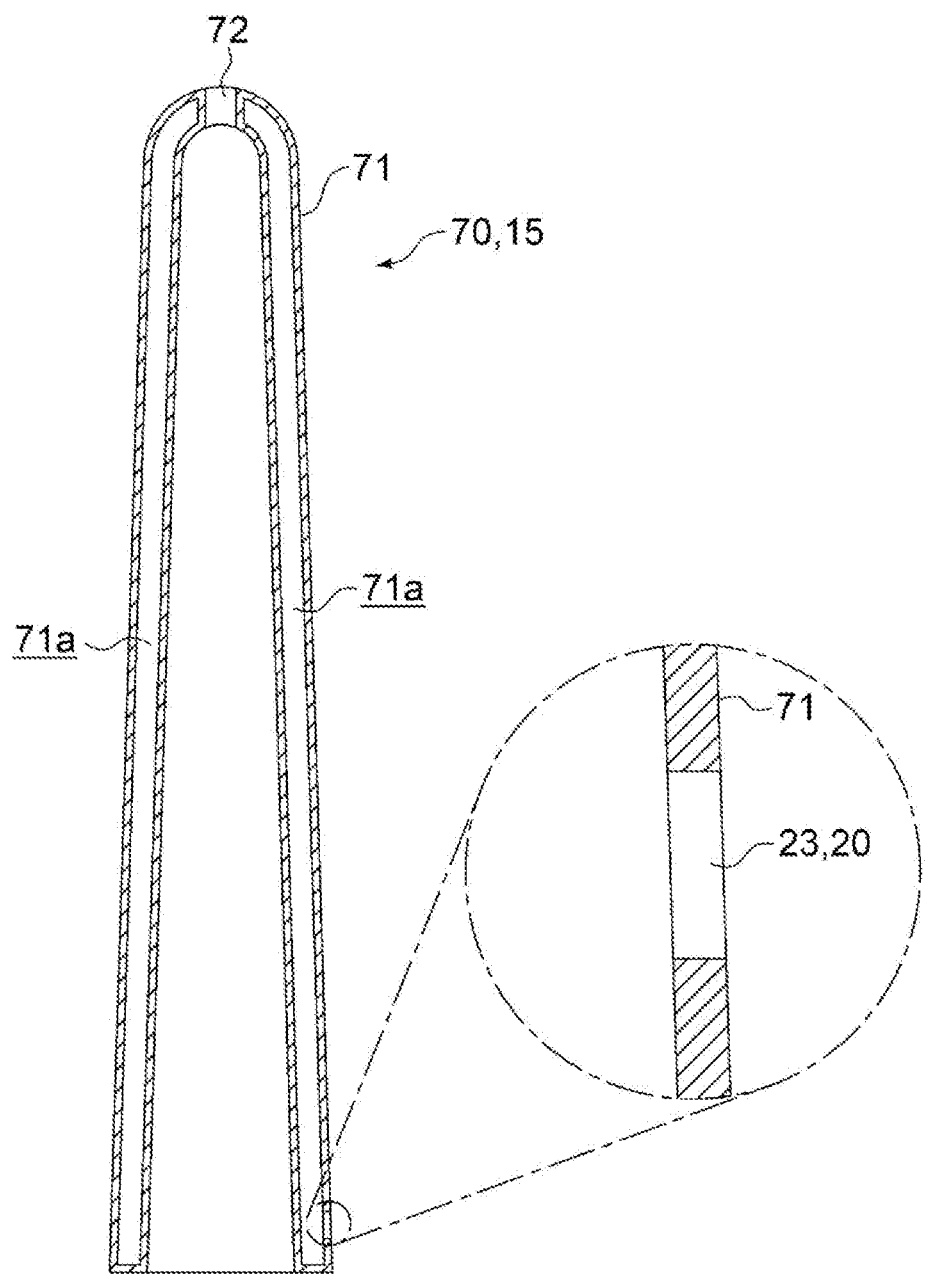
FIG. 6 is a view schematically illustrating a cross section of a fuel nozzle of a gas turbine combustor as an example of the fabricated object.

FIG. 6 is a view schematically illustrating a cross section of a fuel nozzle 70 of a gas turbine combustor as an example of the fabricated object 15. The fuel nozzle 70 includes a nozzle main body 71 having a cylindrical shape. At least one spraying hole 72 for spraying fuel is provided on the tip side (the upper side in the drawing) of the nozzle main body 71.

In the example illustrated in FIG. 6, the nozzle main body 71 has a hollow structure, and an internal space 71a is a closed space. Therefore, when the fuel nozzle 70 illustrated in FIG. 6 is formed using the three-dimensional additive manufacturing apparatus 1 as illustrated in FIG. 1, the residual powder 33 remains in the internal space 71a.

Here, in the example illustrated in FIG. 6, the powder removal opening portion 23 is provided on, for example, a base end side (the lower side in the drawing) of the nozzle main body 71. Accordingly, it is possible to discharge the residual powder 33 in the internal space 71a to the outside from the powder removal opening portion 23.

In addition, similar to some embodiments described above, after the residual powder 33 has been discharged, the plug 40 may be mounted in the powder removal opening portion 23 and the plug 40 may be welded to the nozzle main body 71.

Figure 7:
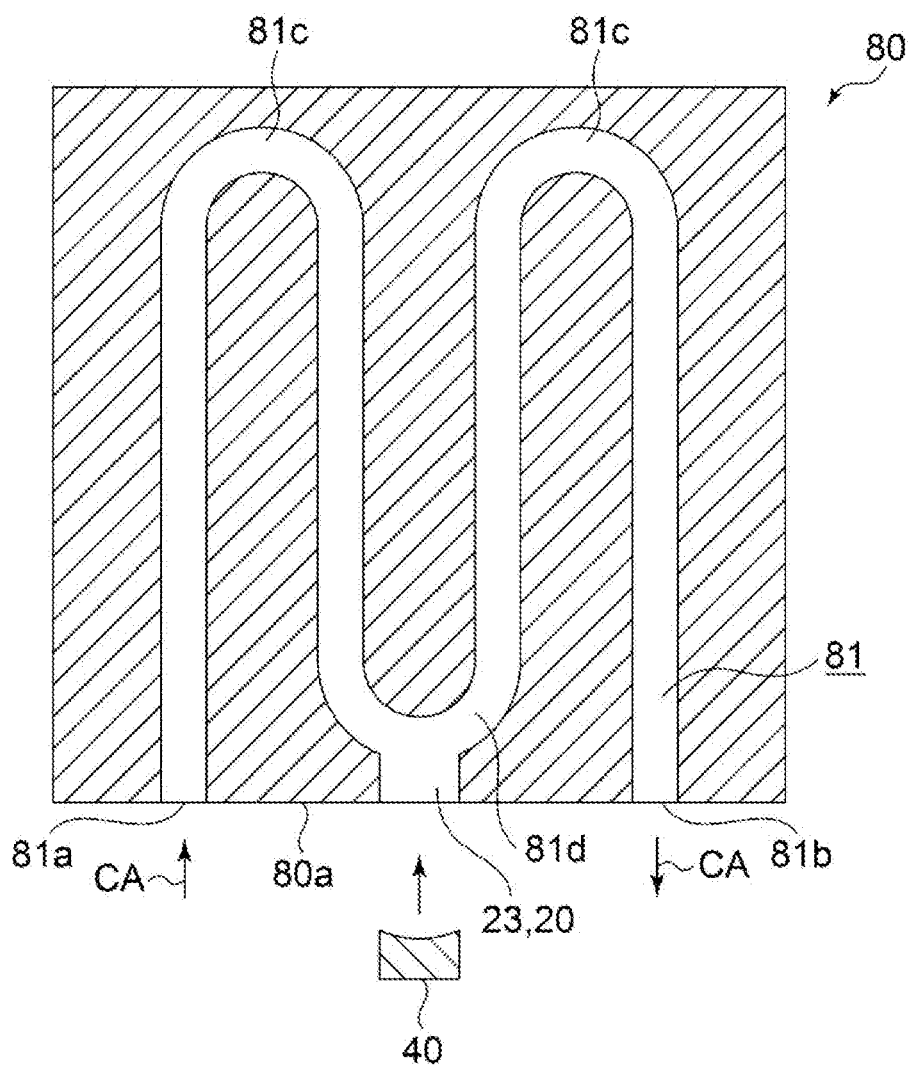
FIG. 7 is a schematic cross-sectional view of a hot part of an industrial gas turbine as another example of the fabricated object.

FIG. 7 is a schematic cross-sectional view of a hot part 80 such as a rotor blade or a stator vane of an industrial gas turbine, or a combustor basket, a transition piece, or a ring segment of a combustor, as another example of the fabricated object 15.

In the example illustrated in FIG. 7, the hot part 80 is formed with a cooling flow path 81 configured to circulate a refrigerant medium CA therein for cooling the hot part 80. In other words, in the example illustrated in FIG. 7, the cooling flow path 81 corresponds to the internal space 17 of the above-described fabricated object 15.

In the example illustrated in FIG. 7, the cooling flow path 81 includes a flow path inlet 81a used for introducing the refrigerant medium CA input from the outside to the cooling flow path 81, and a flow path outlet 81b used for discharging the refrigerant medium CA that has flowed through the cooling flow path 81 to the outside.

For example, in the hot part 80 illustrated in FIG. 7, the cooling flow path 81 is formed as a zigzag flow path. In the hot part 80 illustrated in FIG. 7 for example, in the cooling flow path 81, an intermediate portion 81d of the cooling flow path 81 is far from both the flow path inlet 81a and the flow path outlet 81b, and a bent portion 81c of the cooling flow path 81 exists between the flow path inlet 81a and the flow path outlet 81b. Therefore, it is difficult for the residual powder 33 in the intermediate portion 81d to be discharged from the flow path inlet 81a and the flow path outlet 81b.

Here, in the example illustrated in FIG. 7, the powder removal opening portion 23 is provided at a position that is in the vicinity of the intermediate portion 81d and that is relatively close to an outer surface 80b of the hot part 80.

In other words, for example, in a case of manufacturing the hot part 80 illustrated in FIG. 7, in the step S1 of forming the fabricated object, the hot part 80 may be formed to include the opening portion 20 (powder removal opening portion 23) at a midway position of the cooling flow path 81, which is a flow path that passes through the inside of the hot part 80 that is the fabricated object and extends from the flow path inlet 81a to the flow path outlet 81b.

Accordingly, it is possible to discharge the residual powder 33 in the cooling flow path 81 to the outside from the powder removal opening portion 23.

In addition, similar to some embodiments described above, after the residual powder 33 has been discharged, the plug 40 may be mounted in the powder removal opening portion 23 and welded to the hot part 80.

Accordingly, even in a case where leakage of the refrigerant medium CA from anywhere in the cooling flow path 81 other than the flow path inlet 81a and the flow path outlet 81b is not allowed, it is possible to close the powder removal opening portion 23, and thus, it is possible to prevent leakage of the refrigerant medium CA from the cooling flow path 81 anywhere other than the flow path inlet 81a and the flow path outlet 81b.

Example 1

An example of the method of manufacturing a fabricated object according to some embodiments described above will be described hereinafter.

Example 1 is an example of a case where the powder removal opening portion 23 and the plug 40 have a tapered shape, as illustrated in FIG. 4E. A test piece formed with the powder removal opening portion 23 in Example 1 is a test piece having a plate shape as illustrated in FIG. 4E.

The material of the test piece in Example 1 was a cobalt base alloy.

A thickness tA of the test piece was 1.0 mm.
A thickness tB of the plug 40 was 1.0 mm.
An inner diameter WA1 at the inner opening end 23a of the powder removal opening portion 23 was 2.2 mmΦ, and an inner diameter WA2 at the outer opening end 23b was 2.4 mmΦ.

A diameter WB1 on the small diameter side of the plug 40 was 2.2 mmΦ, and a diameter WB2 on the large diameter side was 2.4 mmΦ.

In Embodiment 1, in the step S9 of welding the plug to the fabricated object, the output of the laser beam as the light beam was 400 W, the scanning speed of the laser beam was 75 mm/min, and the beam diameter of the laser beam was 1.0 mm.

By welding the plug 40 to the test piece according to the above-described conditions, the flatness of the heat-affected region 18 could be set to 0.3 mm or less.

Example 2

A test piece formed with the powder removal opening portion 23 in Example 2 is a test piece including the recessed portion 25 as illustrated in FIG. 5A.

The material of the test piece in Example 2 was a cobalt base alloy.

In Example 2, the thickness tA of the test piece was 5.0 mm.

A thickness tC of a part where the bottom surface 25a of the test piece was formed in Example 2, that is, the dimension of the powder removal opening portion 23 in the thickness direction was 1.0 mm.

In addition, the powder removal opening portion 23 and the plug 40 in Example 2 have a tapered shape as illustrated in FIG. 4E.

The dimensions of each portion of the powder removal opening portion 23 and the dimensions of each portion of the plug 40 in Example 2 are the same as those in Example 1.

A distance LA between the outer edge of the bottom surface 25a (intersection portion between the bottom surface 25a and a tapered inner circumferential surface 25b of the recessed portion 25) and the outer opening end 23b of the powder removal opening portion 23 in Example 2 was 2.0 mm.

An inclination angle θA of the tapered inner circumferential surface 25b in Example 2 was 75 degrees. In addition, an angle θA' formed by the bottom surface 25a and the tapered inner circumferential surface 25b was 105 degrees.

In Example 2, in the step S9 of welding the plug to the fabricated object, the output of the laser beam as the light beam was 650 W, the scanning speed of the laser beam was 50 mm/min, and the beam diameter of the laser beam was 1.0 mm.

By welding the plug 40 to the test piece according to the above-described conditions, the flatness of the heat-affected region 18 could be set to 0.3 mm or less.

The present disclosure is not limited to the embodiments described above and also includes modifications of the above-described embodiments as well as appropriate combinations of these embodiments.

The contents of the embodiments described above can be construed as follows, for example.

(1) The method of manufacturing a fabricated object according to at least one embodiment of the present disclosure, includes: the step S1 of forming the fabricated object 15 by layering the metal powder 30, the fabricated object 15 including the opening portion 20 (powder removal opening portion 23) that communicates with the hollow internal space 17; the step S7 of mounting the plug 40 in the opening portion 20 (powder removal opening portion 23); and the step S9 of welding the plug 40 mounted in the opening portion 20 (powder removal opening portion 23) to the fabricated object 15.

According to the method in (1) described above, by welding the plug 40 mounted in the powder removal opening portion 23 to the fabricated object 15, it is possible to easily close the powder removal opening portion 23 that communicates with the hollow internal space 17.

(2) According to some embodiments, in the method of the above-described (1), the step S5 of discharging the metal powder remaining in the internal space 17 (residual powder 33) from the powder removal opening portion 23 to the outside of the fabricated object 15 after the step S1 of forming the fabricated object, may further be provided.

According to the method in (2) described above, it is possible to discharge the residual powder 33 that remains in the internal space 17 from the powder removal opening portion 23 to the outside of the fabricated object 15.

(3) According to some embodiments, in the method of the above-described (1) or (2), the step S3 of forming the plug 40 by layering the metal powder 30, may further be provided.

According to the method in (3) described above, the plug 40 can be formed by the metal powder 30 used to form the fabricated object 15, and thus, the material of the plug 40 and the material of the fabricated object 15 can be the same.

(4) According to some embodiments, in the method of the above-described (3), in the step S3 of forming the plug, the plug 40 may be formed under the same conditions as fabrication conditions of the fabricated object 15.

According to the method in (4) described above, by forming the plug 40 under the same conditions as the fabrication conditions of the fabricated object 15, quality, for example, surface roughness, dimensional tolerances, and the like can be kept equivalent between the fabricated object 15 and the plug 40.

(5) According to some embodiments, in the method in (3) or (4) described above, in the step S3 of forming the plug, the plug 40 may be formed at the same time as the fabricated object 15.

According to the method in (5) described above, by forming the plug 40 at the same time as the fabricated object 15, quality, for example, surface roughness, dimensional tolerances, and the like can be kept equivalent between the fabricated object 15 and the plug 40.

(6) According to some embodiments, in the method of any one of (1) to (5) described above, in the step S1 of forming the fabricated object, the fabricated object 15 is formed to include the recessed portion 25 and the opening portion 20 (powder removal opening portion 23), the opening portion having a smaller dimension than that of the bottom surface 25a of the recessed portion 25 and being provided in the bottom surface 25a.

According to the method in (6) described above, by providing the recessed portion 25 in the fabricated object 15 and forming the opening portion 20 (powder removal opening portion 23) in the bottom surface 25a of the recessed portion 25, it is possible to reduce the heat capacity of the portion that surrounds the plug 40 in the fabricated object 15, compared to a case where the recessed portion 25 is not provided. Accordingly, even when the thickness of the fabricated object 15 in the vicinity of the powder removal opening portion 23 is relatively thick, it is possible to weld the plug 40 mounted in the powder removal opening portion 23 to the fabricated object 15.

(7) According to some embodiments, in the method of (6) described above, the step S11 of filling the recessed portion with a filler after the step S9 of welding the plug to the fabricated object may further be provided.

According to the method in (7) described above, it is possible to make the surface (outer surface) 15b of the fabricated object 15 smooth by filling the recessed portion 25 with the filler 45.

(8) According to some embodiments, in the method of any one of (1) to (7) described above, in the step S1 of forming the fabricated object, the opening portion 20 (powder removal opening portion 23) is formed so as to gradually decrease in size toward the inner side along the thickness direction of the fabricated object 15.

According to the method in (8) described above, the powder removal opening portion 23 has a so-called tapered shape, and thus, compared to a case where the size of the powder removal opening portion 23 does not change regardless of the position of the fabricated object 15 in the thickness direction, even when the dimensional accuracy of the powder removal opening portion 23 or the plug 40 decreases, a problem is unlikely to occur when the plug 40 is mounted to the powder removal opening portion 23.

(9) According to some embodiments, in the method of any one of (1) to (7) described above, in the step S1 of forming the fabricated object, the opening portion 20 (powder removal opening portion 23) is formed having a maximum dimension of 105% or greater and 110% or less of the maximum dimension of the plug 40.

According to the method in (9) described above, the plug 40 can be easily inserted into the powder removal opening portion 23 while preventing the gap between the powder removal opening portion 23 and the plug 40 from becoming extremely large.

(10) According to some embodiments, in the method of any one of (1) to (9) described above, in the step S9 of welding the plug to the fabricated object, the plug 40 is welded to the fabricated object 15 such that a flatness of the region 18 affected by heat (heat-affected region) generated by welding the plug 40 to the fabricated object 15 is equal to or less than 0.3 mm, on the inner surface 15a of the fabricated object 15 and the inner surface 19a of the closed portion 19, which are surfaces of the fabricated object 15 that faces the internal space 17.

According to the method in (10) described above, the heat-affected region 18 can be made smooth.

(11) According to some embodiments, in the method of any one of (1) to (10) described above, in the step S1 of forming the fabricated object, the fabricated object 15 is formed so as to include the opening portion 20 (powder removal opening portion 23) at a midway position of the cooling flow path 81, which is a flow path that passes through the inside of the fabricated object 15 and extends from the flow path inlet 81a to the flow path outlet 81b.

According to the method in (11) described above, even in a case where leakage of the refrigerant medium CA from anywhere in the cooling flow path 81 other than the flow path inlet 81a and the flow path outlet 81b is not allowed, it is possible to close the powder removal opening portion 23, and thus, it is possible to prevent leakage of the refrigerant medium CA from anywhere in the cooling flow path 81 other than the flow path inlet 81a and the flow path outlet 81b.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method of manufacturing a fabricated object, the method comprising:
   forming the fabricated object by layering metal powder, the fabricated object including an opening portion that communicates with a hollow internal space;
   mounting a plug in the opening portion; and
   welding the plug mounted in the opening portion to the fabricated object such that a flatness of a region affected by heat generated by the welding is equal to or less than 0.3 mm, on a surface of the fabricated object that faces the hollow internal space.

2. The method according to claim 1, further comprising:
   discharging the metal powder remaining in the hollow internal space from the opening portion to an outside of the fabricated object after forming the fabricated object.

3. The method according to claim 1, wherein
   the opening portion is formed so as to have a maximum dimension of 105% or greater and 110% or less of a maximum dimension of the plug.

4. The method according to claim 1, wherein
   the fabricated object is formed so as to include the opening portion at a midway position of a flow path that passes through an inside of the fabricated object and extends from a flow path inlet to a flow path outlet.

5. The method according to claim 1, wherein
   the fabricated object is formed to include a recessed portion and the opening portion, the opening portion having a smaller dimension than that of a bottom surface of the recessed portion and being provided in the bottom surface of the recessed portion.

6. The method according to claim 5, further comprising:
   filling the recessed portion with a filler after welding the plug to the fabricated object.

7. The method according to claim 1, wherein
   the opening portion is formed so as to decrease in size toward an inner side along a thickness direction of the fabricated object.

8. The method according to claim 7, wherein
   the opening portion has a tapered cross-sectional shape along the thickness direction of the fabricated object.

9. The method according to claim 1, further comprising:
   forming the plug by layering the metal powder.

10. The method according to claim 9, wherein
    the plug is formed under the same conditions as fabrication conditions of the fabricated object.

11. The method according to claim 9, wherein
    the plug is formed at the same time as the fabricated object.

* * * * *